United States Patent
Chung et al.

(10) Patent No.: US 10,830,572 B2
(45) Date of Patent: Nov. 10, 2020

(54) HEMISPHERE AMBIGUITY CORRECTION IN ELECTROMAGNETIC POSITION TRACKING SYSTEMS

(71) Applicant: Google LLC, Mountain View, CA (US)

(72) Inventors: Sherk Chung, Mountain View, CA (US); Ian Atkinson, Mountain View, CA (US); Advait Jain, Mountain View, CA (US); Lucine Oganesian, Mountain View, CA (US); Murphy Stein, Mountain View, CA (US); Saket Patkar, Mountain View, CA (US); Robert Oliver, Mountain View, CA (US)

(73) Assignee: Google LLC, Mountain View, CA (US)

( * ) Notice: Subject to any disclaimer, the term of this patent is extended or adjusted under 35 U.S.C. 154(b) by 354 days.

(21) Appl. No.: 15/814,611

(22) Filed: Nov. 16, 2017

(65) Prior Publication Data

US 2019/0113325 A1    Apr. 18, 2019

Related U.S. Application Data

(60) Provisional application No. 62/571,445, filed on Oct. 12, 2017.

(51) Int. Cl.
  *G01B 7/004*    (2006.01)
  *G02B 27/01*    (2006.01)
  (Continued)

(52) U.S. Cl.
  CPC .......... *G01B 7/004* (2013.01); *G01C 21/165* (2013.01); *G01S 1/70* (2013.01); *G01S 1/7034* (2019.08); *G01S 5/16* (2013.01); *G01V 3/104* (2013.01); *G02B 27/017* (2013.01); *H04B 5/0043* (2013.01); *G01P 15/14* (2013.01); *G01S 11/00* (2013.01); *G01S 2201/01* (2019.08)

(58) Field of Classification Search
  CPC ... G01B 7/004; G01S 5/16; G01S 1/70; G01S 11/00; G01C 21/165; H04B 5/0043; G02B 27/017; G01V 3/104; G01P 15/14
  See application file for complete search history.

(56) References Cited

U.S. PATENT DOCUMENTS 4,737,794 A  *  4/1988  Jones ...................... F41G 3/225
                                                            342/386
8,018,382 B2 *  9/2011  Shore ..................... G01C 15/00
                                                            342/386

(Continued)

OTHER PUBLICATIONS

International Preliminary Report on Patentability dated Dec. 12, 2019 for corresponding International Application No. PCT/US2018/040895, 14 pages.

(Continued)

*Primary Examiner* — Lee E Rodak (57) ABSTRACT

A method of receiving EM field magnitude values indicative of a first pose of a mobile unit in relation to a base unit, receiving sensor data from a second sensor associated with the mobile unit, where the sensor data is indicative of a direction of movement of the mobile unit, calculating a set of candidate pose solutions based on the EM field magnitude values, selecting a pose from the set of candidate pose solutions based on the sensor data from the second sensor, and sending the pose to the processor.

20 Claims, 10 Drawing Sheets

(51) Int. Cl.
*G01V 3/10* (2006.01)
*G01S 1/70* (2006.01)
*G01S 5/16* (2006.01)
*G01C 21/16* (2006.01)
*H04B 5/00* (2006.01)
*G01P 15/14* (2013.01)
*G01S 11/00* (2006.01)

(56) References Cited

U.S. PATENT DOCUMENTS

| | | | |
|---|---|---|---|
| 8,180,430 B2* | 5/2012 | Govari | A61B 90/36 324/261 |
| 8,264,419 B2 | 9/2012 | Brune et al. | |
| 2014/0051983 A1* | 2/2014 | Schroeder | A61B 34/20 600/424 |
| 2015/0308861 A1 | 10/2015 | Jung et al. | |
| 2016/0011013 A1 | 1/2016 | Pedrotti et al. | |
| 2016/0259404 A1* | 9/2016 | Woods | G06F 3/012 |
| 2016/0377451 A1 | 12/2016 | Pedrotti et al. | |
| 2016/0377688 A1* | 12/2016 | Kleiner | G01R 33/0035 324/202 |
| 2019/0086482 A1 | 3/2019 | Chung et al. | |

OTHER PUBLICATIONS

Written Opinion of the International Preliminary Examining Authority dated Sep. 6, 2019 for corresponding International Application No. PCT/US2018/040895, 7 pages.

International Search Report and Written Opinion dated Oct. 16, 2018 for corresponding International Application No. PCT/US2018/040895, 19 pages.

Traian, A. et al., "Distortion Rejecting Magneto-Inductive Three-Dimensional Localization (MagLoc)" IEEE Journal on Selected Areas in Communications, vol. 33, No. 11; Nov. 1, 2015; pp. 2404-2417.

* cited by examiner

FIG. 10

HEMISPHERE AMBIGUITY CORRECTION IN ELECTROMAGNETIC POSITION TRACKING SYSTEMS

CROSS-REFERENCE TO RELATED APPLICATIONS

The present application is related to and claims priority to the following application, the entirety of which is incorporated by reference herein: U.S. Provisional Patent Application Ser. No. 62/571,445, entitled "HEMISPHERE AMBIGUITY CORRECTION IN ELECTROMAGNETIC POSITION TRACKING SYSTEMS", filed Oct. 12, 2017.

BACKGROUND

Field of the Disclosure

The present disclosure relates generally to position tracking systems and more specifically to electromagnetic (EM) position tracking systems.

Description of the Related Art

Position tracking systems that use near-field EM fields, also known as EM position tracking systems, generally include a transmitter that generates an EM field using a tri-axis coil to induce a current on a second tri-axis coil located at a remote receiver. The receiver generates values corresponding to the EM field magnitude which are then processed to compute a position and/or orientation (or "pose") of the receiver relative to the transmitter. However, the calculations that convert the EM field magnitude values (EM magnitude values) into position data can have multiple valid solutions (that is, multiple candidate poses can satisfy the equations that govern the conversion). The resulting ambiguity in the correct position is referred to as "hemisphere ambiguity" since the two candidate positions can be expressed as opposite of each other along a sphere, where each of possible position solutions are in separate hemispheres of the sphere.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-10 illustrate methods and systems for hemisphere disambiguation in an EM position tracking system wherein the methods and systems employ a second sensor to support EM position tracking for objects in an EM field. For example, an HMD can employ an EM position tracking system using a base unit, such as the HMD itself, and a mobile unit, such as a wireless handheld controller, to identify the pose of the mobile unit (e.g., the handheld controller). The EM position tracking system generates an EM pose value for the mobile unit in the EM field. Hemisphere ambiguity arises when a processor associated with the EM position tracking system calculates, based on a set of EM equations, a pose value for the tracked object (e.g., the handheld controller) moving within the EM field and creates two candidate pose values. As both candidate poses are valid solutions for the EM equations, the processor cannot determine, based on the EM equations alone, which pose value accurately reflects the actual pose of the object. Accordingly, to arrive at the correct pose, the EM position tracking system also employs a second sensor, such as an IMU, to generate a "direction of movement" value corresponding to the movement of the object being tracked in the EM field. The processor calculates a final pose by comparing the two candidate pose values, derives an estimated direction of movement value based on previous pose values, and compares the derived estimated direction of movement value to the direction of movement value from the second sensor. The processor then chooses the candidate pose value that is closest to the direction estimated from the second sensor. The HMD therefore performs hemisphere disambiguation without user input (for example, the user manually entering data on a keyboard or pre-selecting preferred hemispheres), thereby improving the user experience.

Figure 1:
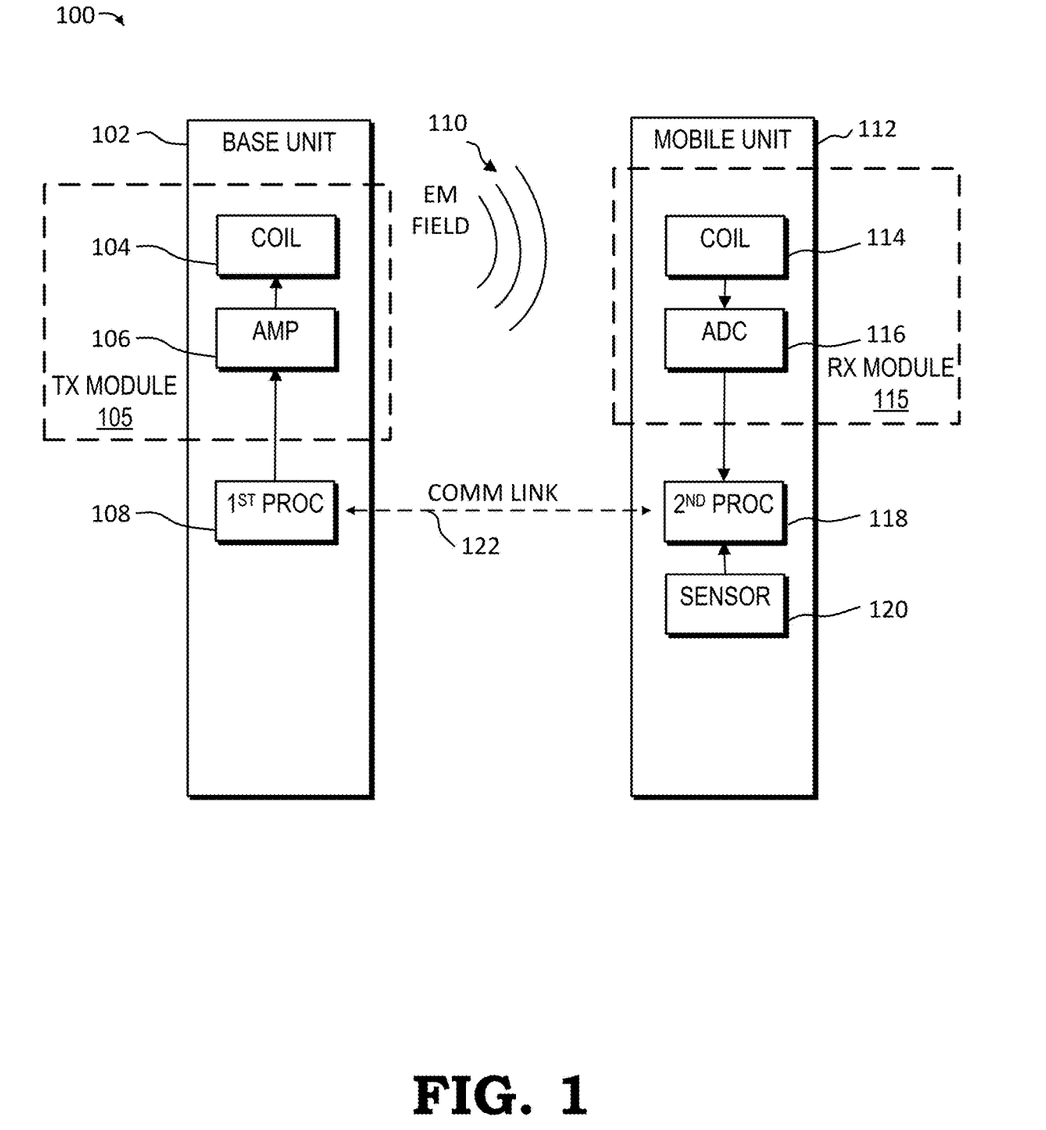
FIG. 1 is a block diagram of an EM position tracking system that includes a base unit generating an EM field for use by a mobile unit in accordance with some embodiments.

FIG. 1 is a block diagram of an EM position tracking system 100 that includes a base unit 102 generating an EM field 110 for use by a mobile unit 112 in accordance with some embodiments. Other embodiments are possible and are not limited by this disclosure. Base unit 102 includes an EM transmitter module (EM transmitter) 105 having a coil 104 and a power amplifier 106, and further includes a first processor 108. The mobile unit 112 includes an EM receiver module (EM receiver) 115 having a coil 114 and an analogto-digital converter (ADC) 116, a second processor 118, and a second sensor 120. The base unit 102 establishes communications with the mobile unit 112 by a communications link 122. The communications link 122 can be, but is not limited to, a wireless network link, a RF radio link, an IR light link, a USB connection, an Ethernet link, or other methods suitable for communications. The communications link 122 allows the base unit 102 to send and receive data to and from the mobile unit 112. The data includes, but is not limited to, pose data and sensor data from the base unit 102 or the mobile unit 112.

In the present embodiment, the base unit 102 generates the EM field 110 to be received by the mobile unit 112. The mobile unit 112 is located within the EM field 110 where the magnitude of the EM field 110 is sensed by the EM coil 114. As the mobile unit 112 moves around and within the EM field 110, a set of EM field magnitude values are generated by the EM coil 114. These values could be constantly changing in both magnitude and direction in three dimensions as the mobile unit 112 changes pose within the EM field 110. The ADC 116 receives the EM field magnitude values from the EM coil 114 and converts them into a digital form for use by the second processor 118. In at least one embodiment, the base unit 102 is stationary, while in other embodiments, the base unit 102 is moving. In other embodiments, base unit 102 includes a housing (not shown) to mount on a head of a user. The mobile unit 112 second processor 118 performs calculations on the EM field magnitude values to generate EM pose data. Alternatively, the mobile unit 112 can send the EM field magnitude values to the base unit 102 first processor 108 as one input for calculation of the pose. In yet another embodiment, the base unit 102 and the mobile unit 112 can share calculation tasks as needed or assigned based on processor tasking, time-shared procedures, or the like as requested at the time the calculations are made. In yet another embodiment, the calculations are done a third processor (not shown) in communication with the first processor 108 or second processors 118.

In the present embodiment, the power amplifier 106 receives a transmit signal from the first processor 108 and sends electrical power to the EM coil 104 for use in generating the EM field 110. The transmit signal enables the power amplifier 106 to begin generating the EM field 110. In some embodiments, the power amplifier 106 is located within the base unit 102. The EM transmitter 104 can use a tri-axis coil or other device to generate the EM field 110 that transits into the world frame environment that includes the mobile unit 112. The mobile unit 112 is placed within the EM field 110 and senses the field magnitudes of the EM field 110 a distance away from the base unit 102 using the EM receiver 114. Within the mobile unit 112, the EM coil 114 senses the EM field 110 and identifies EM magnitude values which are sent to the ADC 116. The ADC 116 conditions the EM magnitude values for use by the second processor 118. In at least some embodiments, the ADC 116 can also function as an electrical filter for the incoming EM magnitude values to further process and level-shift the EM magnitude values for use by the second processor 118. Also, in at least some embodiments, ADC 116 can be employed as a noise isolation filter for the incoming EM magnitude values. The second processor 118 receives the EM magnitude values and converts them into EM pose data of the mobile unit 112 in relation to the base unit 102 based on the EM field 110 magnitude sensed by the mobile unit 112.

The mobile unit 112 also employs the second sensor 120 as a second sensing device to determine direction of movement data of the mobile unit 112. The second sensor 120 is placed in mechanical contact with a known fixed alignment with the mobile unit 112 to gather direction of movement data. The second sensor 120 can include, but is not limited to, an IMU, an accelerometer, a gyroscope, a magnetometer, other inertial-type sensors, other motion sensors, other pose sensors, or a GPS sensor. In the present embodiment, the second sensor 120 includes an accelerometer and a gyroscope. Once initialized, the second sensor 120 generates and sends direction of movement data to the second processor 118. In at least some applications, the second sensor 120 generates direction of movement data directly compatible for use by the second processor 118. In other embodiments, the direction of movement data may undergo additional filtering and conversion in order to be used by the second processor 118. The communications link 122 connecting the base unit 102 and the mobile unit 112 is used to send signals to and from the base unit 102 first processor 108 and the mobile unit 112 second processor 118 to exchange pose data, direction of movement data, data for operation of the EM position tracking system 100, HMD, VR, or AR system, and the like.

EM position tracking system 100 performs hemisphere disambiguation in accordance with some embodiments. First processor 108 or second processor 118 calculates a set of candidate pose values based on the EM field magnitude values generated by the mobile unit 112. Mobile unit 112 also employs the second sensor 120 that generates direction of movement data for use by the first processor 108 or the second processor 118 in calculating a final pose value as described herein.

In some embodiments, the EM transmitter 105 and the EM receiver 115 are swapped, so that the EM transmitter 105 is in mechanical contact with the mobile unit 112, and the EM receiver 115 is in mechanical contact with the base unit 102.

Figure 2:
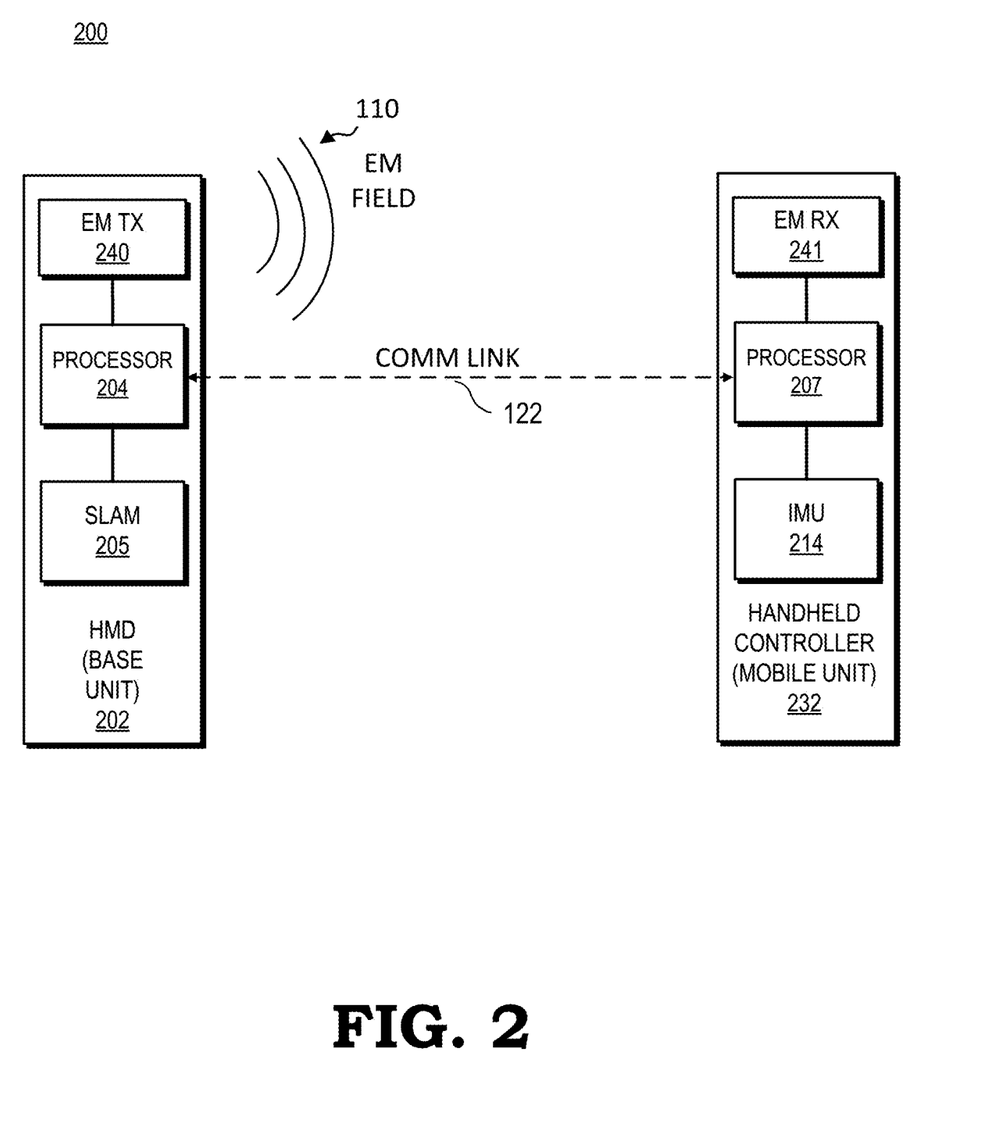
FIG. 2 is a block diagram illustrating the EM position tracking system of FIG. 1 that includes a head-mounted display (HMD)-based system with an inertial measurement unit (IMU) to perform hemisphere disambiguation in accordance with some embodiments.

FIG. 2 is a block diagram illustrating the EM position tracking system of FIG. 1 that includes a head-mounted display (HMD)-based system 200 with an inertial measurement unit (IMU) 214 to perform hemisphere disambiguation in accordance with some embodiments. The EM position tracking system 100 is used by the HMD-based system 200 to determine the pose of the mobile unit 112 in relation to the base unit 102 in accordance with some embodiments. HMD-based system 200 is but one embodiment of EM position tracking system 100 as described in FIG. 1. In the illustrated embodiment, HMD-based system 200 includes a HMD 202 that corresponds to the base unit 102 of FIG. 1, while a handheld controller 232 corresponds to the mobile unit 112 of FIG. 1. In at least some embodiments, the HMD device 202 is also termed a base unit 202, and the handheld controller 232 is also termed a mobile unit 232. In at least one embodiment, the HMD device 202 is stationary, while in other embodiments, the HMD device 202 is moving. In other embodiments, HMD device 202 includes a housing (not shown) to mount on a head of a user. The HMD-based system 200 contains various electronic and optical components used to display visual content to the user, output audio content to the user, and track the pose of the mobile unit 112 as described further herein. The HMD-based system 200 contains various electronic and optical components used to display visual content to the user, output audio content to the user, and track the pose of the handheld controller 232 as described further herein.

As a general overview of the operation of the HMD-based system 200, the HMD device 202 includes a processor 204 that executes instructions to provide a virtual reality (VR)

experience to a user. For example, the processor 204 can execute instructions to display visual content via the one or more near-eye displays and output audio content via one or more speakers (not shown). To support provision of the VR experience, the HMD device 202 keeps track of its own pose within an environment of the HMD-based system 200. As used herein, the term "pose" refers to the position of an object, the orientation of the object, or a combination thereof. Thus, the HMD device 202 can keep track of its position within the environment, can keep track of its orientation within the environment, or can keep track of both its position and its orientation.

To keep track of its pose within the environment, in one embodiment the HMD device 202 employs a simultaneous localization and mapping (SLAM) module 205, which is configured to generate pose information for the HMD device 202 based on SLAM techniques. For example, in some embodiments, the SLAM module 205 is configured to receive imagery of the environment from one or more image capturing devices (not shown), identify features from those images, and to identify the pose of the HMD device 202 based on the identified features. In at least one embodiment, the SLAM module 205 can employ additional pose detection sensors, such as inertial sensors, global positioning system sensors, and the like, to assist in identifying the pose of the HMD device 202. The SLAM module 205 provides the pose information to the processor 204, which in turn employs the pose information to place the HMD device 202 in a virtual environment.

To further enhance the VR experience, the HMD device 202 also continuously updates the pose of the handheld controller 232. In particular, to identify the pose, HMD-based system 200 utilizes an EM field detection system including an EM field transmitter 240 to generate an EM field 110 and, located in the handheld controller 232, an EM field receiver 241 to detect a magnitude of the EM field 110. In the depicted example, the EM field transmitter 240 is located at or within a housing of the HMD device 202, and the EM field receiver 241 is located at or within a housing of the handheld controller 232. However, because the EM field detection system is generally configured to generate a relative pose between the EM transmitter 240 and the EM receiver 241, other configurations are possible. For example, in at least one embodiment, the EM transmitter 240 is located at or within a housing of the handheld controller 232, and the EM receiver 241 is located at or within a housing of the HMD device 202. In another embodiment, both the HMD device 202 and the handheld controller 232 contain EM field receivers 240 while the EM transmitter 241 is located in a third base unit (not shown). In yet another embodiment, the HMD device 202 and handheld controller 232 contain EM transmitters 240, while the EM receiver is located in a third base unit.

In the illustrated example, the handheld controller 232 includes the IMU 214 to assist in pose detection for the handheld controller 232. In particular, the IMU 214 periodically or continuously generates pose information for the handheld controller 232 based on one or more motion sensors of the IMU 214, such as one or more accelerometers, gyroscopes, or a combination thereof. A processor 207 of the handheld controller 232 combines pose data generated by the IMU 214 (hereinafter, the "IMU pose data") and pose data generated based on the EM field 110 (hereinafter, the "EM pose data") to generate a combined pose and provides the combined pose to the HMD device 202 via a communication link 122. The HMD device 202 can employ the combined pose to identify the pose of the handheld controller 232 relative to the HMD device 202, and make changes to the virtual environment based on the combined pose. This allows a user to interact with the virtual environment using the handheld controller 232.

Hemisphere ambiguity arises in the HMD-based system 200 when the EM magnitude data is used to calculate an EM pose value. The ambiguity is caused by using a coil sensor, such as the EM receiver 241 to generate a pose value in 3-dimensional (3-D) space. A consequence of using EM magnitude data to solve for position is that the calculations will produce a set of two valid pose solutions, referred to as candidate pose values. To correct for such ambiguity, the HMD-based system 200 of FIG. 2 corrects for hemisphere ambiguity by comparing an estimated direction of movement indicated by the EM pose data with the direction of movement data provided by the IMU 214. In particular, the processor 207 compares the current EM pose data with previous EM pose data to derive an estimated EM-based direction of movement data for the object. The processor 207 then compares the EM-based direction of movement data and selects the candidate pose value most closely aligned with the estimated direction of movement of the object. The selected candidate pose value is used by the HMD-based system 200 to calculate distances, ranges, motion, and the like of the handheld controller 232 as needed for system operation and image generation in the HMD-based system 200.

Figure 3:
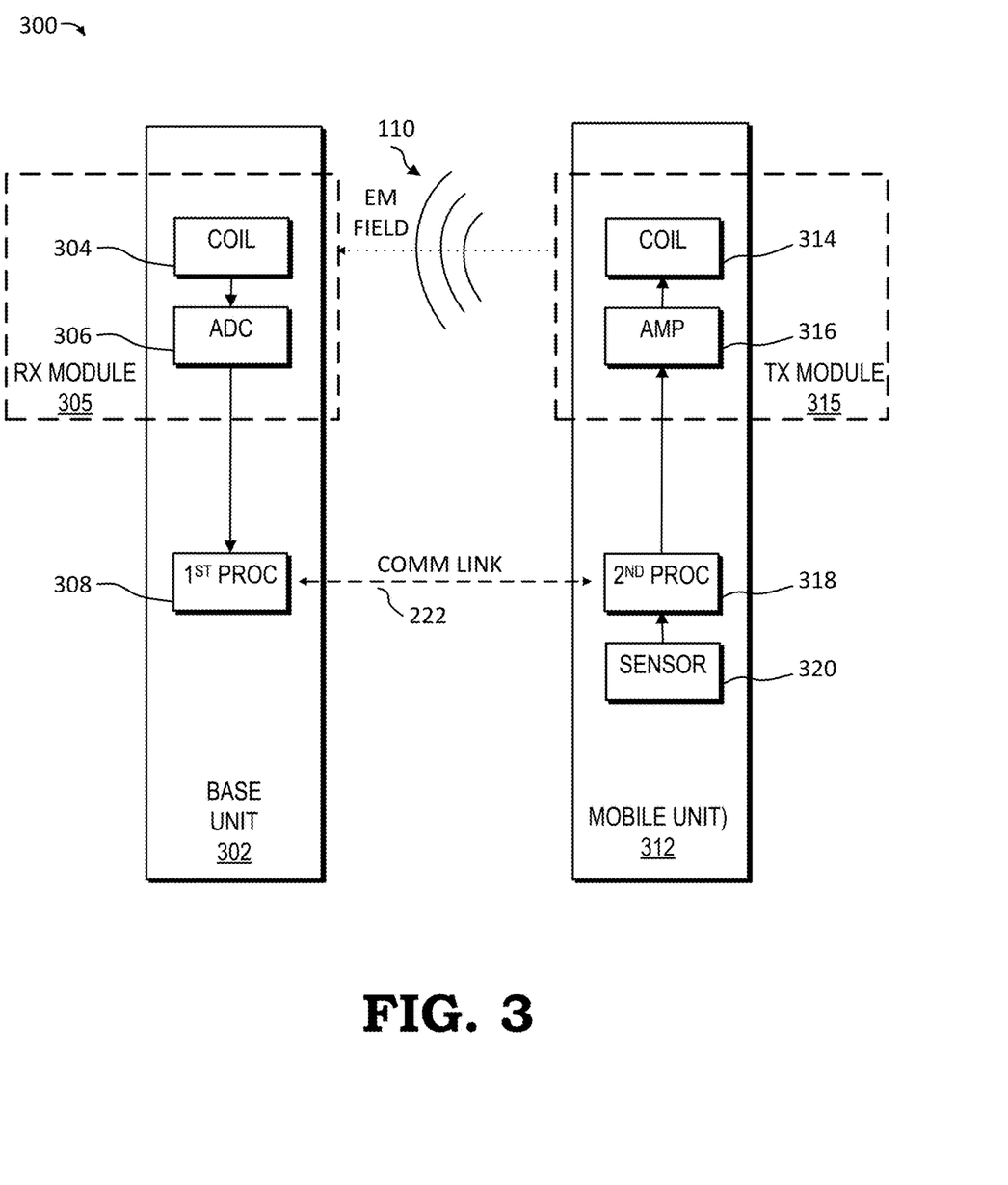
FIG. 3 is a block diagram of an EM position tracking system that includes a mobile unit generating an EM field and a base unit in accordance with some embodiments.

FIG. 3 is a block diagram of an EM position tracking system 300 that includes a mobile unit 312 generating the EM field 110 and a base unit 302 in accordance with some embodiments. FIG. 3 shows a similar system as disclosed in FIG. 1, but while FIG. 1 illustrates a base unit 102 generating the EM field 110 and being received by the mobile unit 112, FIG. 3 illustrates an alternative environment where the mobile unit 312 generates the EM field 110 that is sensed at the base unit 302. In the embodiment of FIG. 3, the base unit 302 employs an EM receiver 305 having a coil 304 and an ADC 306, and further includes a first processor 308. The mobile unit 312 uses an EM transmitter 315 having a coil 314 and a power amplifier 316, and further includes a second processor 318, and a second sensor 320.

In one or more embodiments, base unit 302 establishes a relative pose to the world frame by employing sensors (not shown) to sense its own location and establishing that location as a baseline location. The sensors may be internal to the base unit 302 or, in alternative embodiments, be part of an external alignment procedure or tool to align and calibrate the base unit 302 to a known pose at system startup. In the present embodiment, the power amplifier 316 receives a transmit signal from the second processor 318 and sends electrical power to the coil 314 for use in generating the EM field 110. The transmit signal enables the power amplifier 316 to begin generating the EM field 110 for use by the base unit 302. Meanwhile, in at least some embodiments, the first processor 308 or the second processor 318 can store data, including, but not limited to, pose data, lookup table data, calibration data, etc. recorded over time as described herein. In a similar manner as disclosed in FIG. 1, EM position tracking system 300 generates EM pose data and direction of movement data for use by the first processor 308, second processor 318 or a third processor (not shown) in calculating a final pose for the mobile unit 312.

EM position tracking system 300 performs hemisphere disambiguation in accordance with some embodiments. In at least one embodiment, the base unit 302 is stationary, while in other embodiments, the base unit 302 is moving. In other embodiments, base unit 302 includes a housing (not shown)

to mount on a head of a user. The EM position tracking system 300 contains various electronic and optical components used to display visual content to the user, output audio content to the user, and track the pose of the mobile unit 312 as described further herein. In the present embodiment, mobile unit 312 generates the EM field 110, which is sensed by the base unit 302. The first processor 108, second processor 118 or a third processor (not shown) calculates a set of pose values based on the EM field magnitude values generated by the base unit 302. The mobile unit 112 also employs the second sensor 320 to generate a direction of movement value for use by the first processor 308 or the second processor 318 or a third processor (not shown) in calculating a final pose value as described herein.

Figure 4:
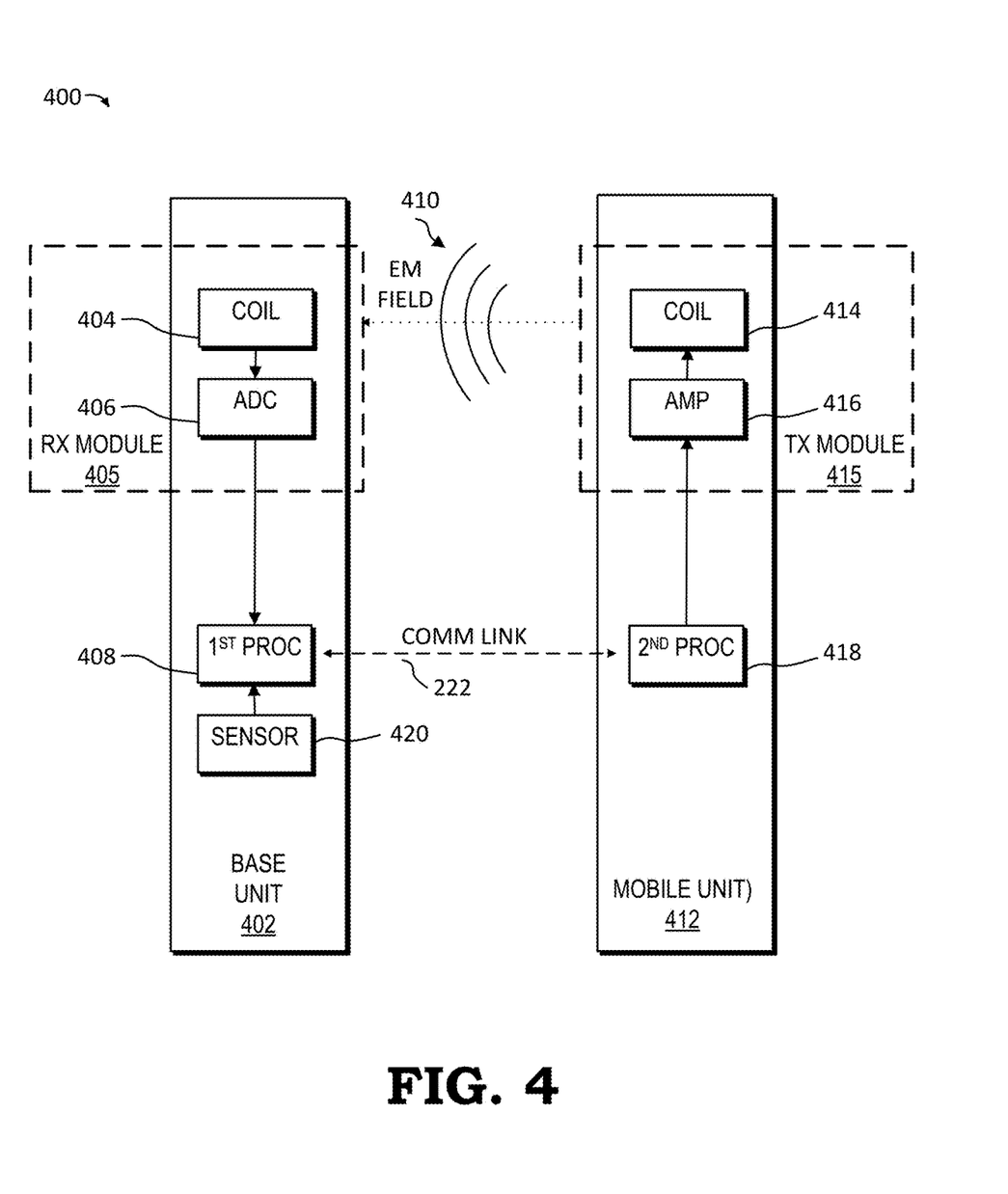
FIG. 4 is a block diagram of an EM position tracking system that includes a mobile unit generating an EM field and a base unit having a second sensor for hemisphere disambiguation in accordance with some embodiments.

FIG. 4 illustrates an EM position tracking system 400 that can perform hemisphere disambiguation in accordance with some embodiments. The EM position tracking system 400 is similar to the example of FIG. 3, but in the example of FIG. 4 the second sensor 420 is located at a base unit 402. The other modules of the EM position tracking system 400, including an RX module 405 (including a coil 404 and ADC 406), and processor 408 of the base unit 404, and a TX module 415 (including a coil 414 and amplifier 416) and a processor 418 of a mobile unit 412 operate similarly to the corresponding modules of FIG. 3. However, because the second sensor 420 is located at the base unit 402, the EM position tracking system 400 can disambiguate hemisphere ambiguity based on the motion of the base unit 402, rather than the mobile unit 412. In particular, and as described further herein, the EM position tracking system can perform hemisphere disambiguation based on direction of movement indicated by the second sensor 420, or can perform hemisphere disambiguation by employing the second sensor 420 to identify movement of the base unit 402 relative to a world frame.

Figure 5:
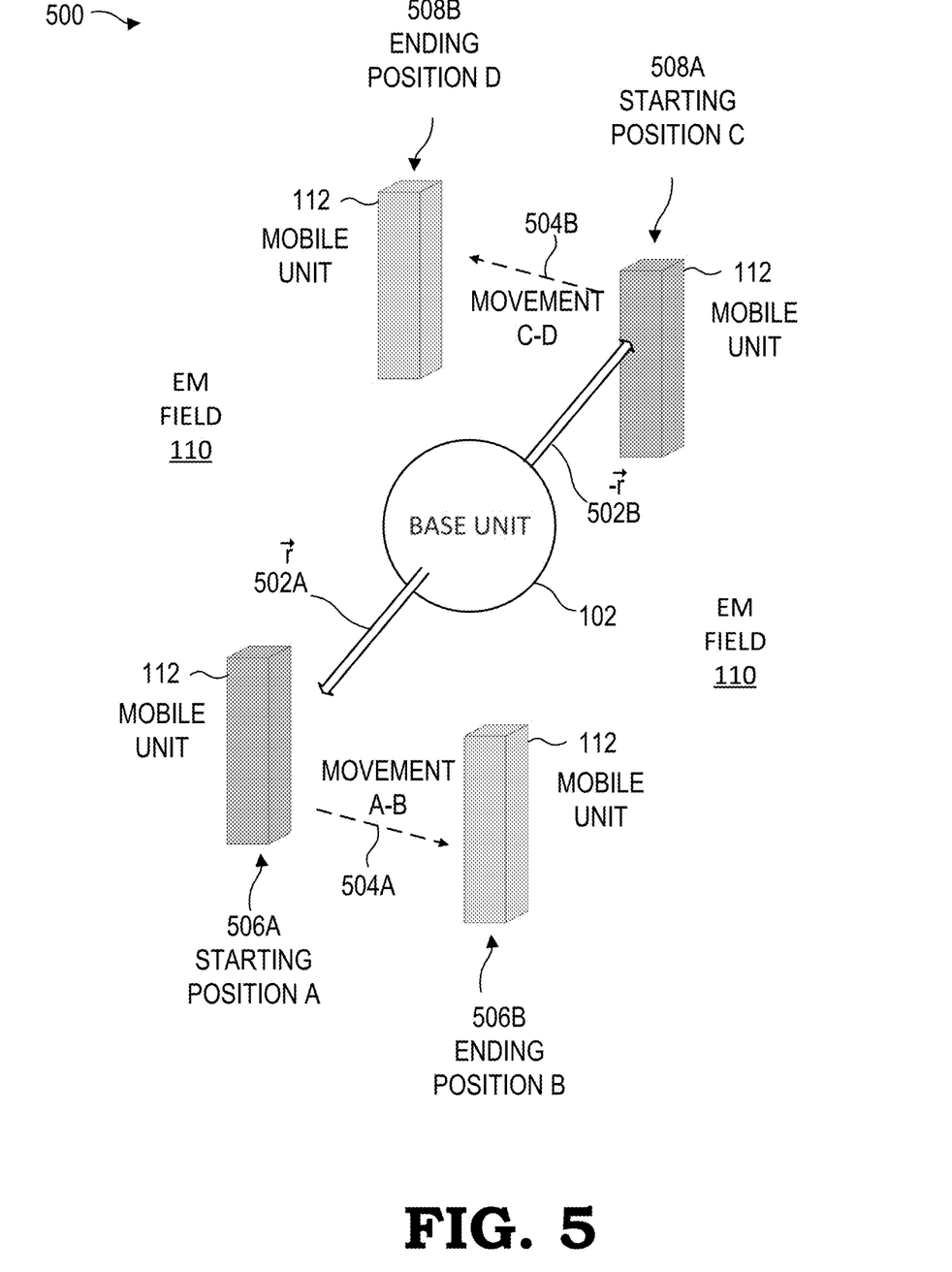
FIG. 5 is a diagram of the EM position tracking system of FIG. 1 showing hemisphere ambiguity associated with a mobile unit moving in relation to a base unit within an EM field in accordance with some embodiments.

FIG. 5 is a diagram of an EM position tracking system 500 showing hemisphere ambiguity associated with a mobile unit 112 moving in relation to a base unit 102 within an EM field 110 in accordance with some embodiments. FIG. 5 illustrates the candidate poses of mobile unit 112 before and after moving within the EM field 110 of FIG. 1. The first processor 108 (not shown) of base unit 102 calculates a set of two possible candidate pose solutions as disclosed in FIG. 1. The two candidate pose solutions are shown graphically in FIG. 5 by the mobile unit 112 beginning in positions 506A ("starting position 'A') and 508A (starting position 'C'). Both candidate poses are mathematically valid solutions and the EM position tracking system 500 cannot determine which is the correct pose without additional information. For systems such as VR "inside-out" systems, the starting pose of the handheld controller (mobile unit 112) relative to the HMD device (base unit 102) could be arbitrary and since the controller operation is not limited to a particular area of space, ascertaining the actual candidate pose is not trivial.

As described further below, in the example of FIG. 5 when the mobile unit 112 moves, at least two sensors provide an indication of a direction of motion: an EM sensor and a second, non-EM sensor such as an IMU. To disambiguate between candidate poses, the EM position tracking system 100 selects the candidate pose that more closely aligns with the direction of movement indicated by the second, non-EM sensor. With respect to the example of FIG. 5, the mobile unit 112 is shown both before and after being moved within the EM field 110. One candidate starting pose is shown at candidate starting position 'A' 506A. The example of FIG. 5 also illustrates an "r-vector" 502A, which represents the displacement in space of the candidate poses with respect to the base unit. When the mobile unit 112 moves, it transits along candidate pose movement 506A to candidate ending position 'B' 506B. At the same time, the EM tracking position system 100 calculates both the candidate pose and the copy pose. In this example, along with the candidate pose just described, a second candidate pose results. These include mobile unit 112 in starting position 'C' 508A, the mobile unit 112 moving along in the direction of the candidate pose movement 504B, and mobile unit 112 stopping at the candidate ending position 'D' 508B. Thus, determining a pose solution as used in the EM position tracking system 100, results in two possible candidate pose solutions.

In at least some embodiments, the second sensor 120 is an IMU located in the mobile unit 112 and rigidly affixed some distance from the EM receiver 114, such that distance between the mobile unit 112 and the EM receiver 114 is to be accounted for. In such embodiments, the acceleration of the EM receiver 114 is expressed by:

$$\vec{a} + \vec{\omega} \times (\vec{\omega} \times \vec{r}) + (\vec{\alpha} \times \vec{r}) \qquad \text{Equation 1}$$

where:

($\vec{a}$) is the acceleration of the accelerometer with regard to the world frame;

($\vec{r}$) is the vector from the second sensor 120 location to the EM receiver 114;

($\vec{\omega}$) is the angular velocity of the gyroscope with regard to the world frame;

($\vec{\alpha}$) is the angular acceleration of the second sensor 120 with regards to the world frame;

$\vec{\omega} \times (\vec{\omega} \times \vec{r})$ represents the centrifugal force; and ($\vec{\alpha} \times \vec{r}$) represents the Euler force, where the Euler force is the tangential force that is sensed in reaction to an angular acceleration.

It will be appreciated that the above equation applies for an IMU, and will vary depending on the type of non-EM sensor employed as the second sensor.

Figure 6:
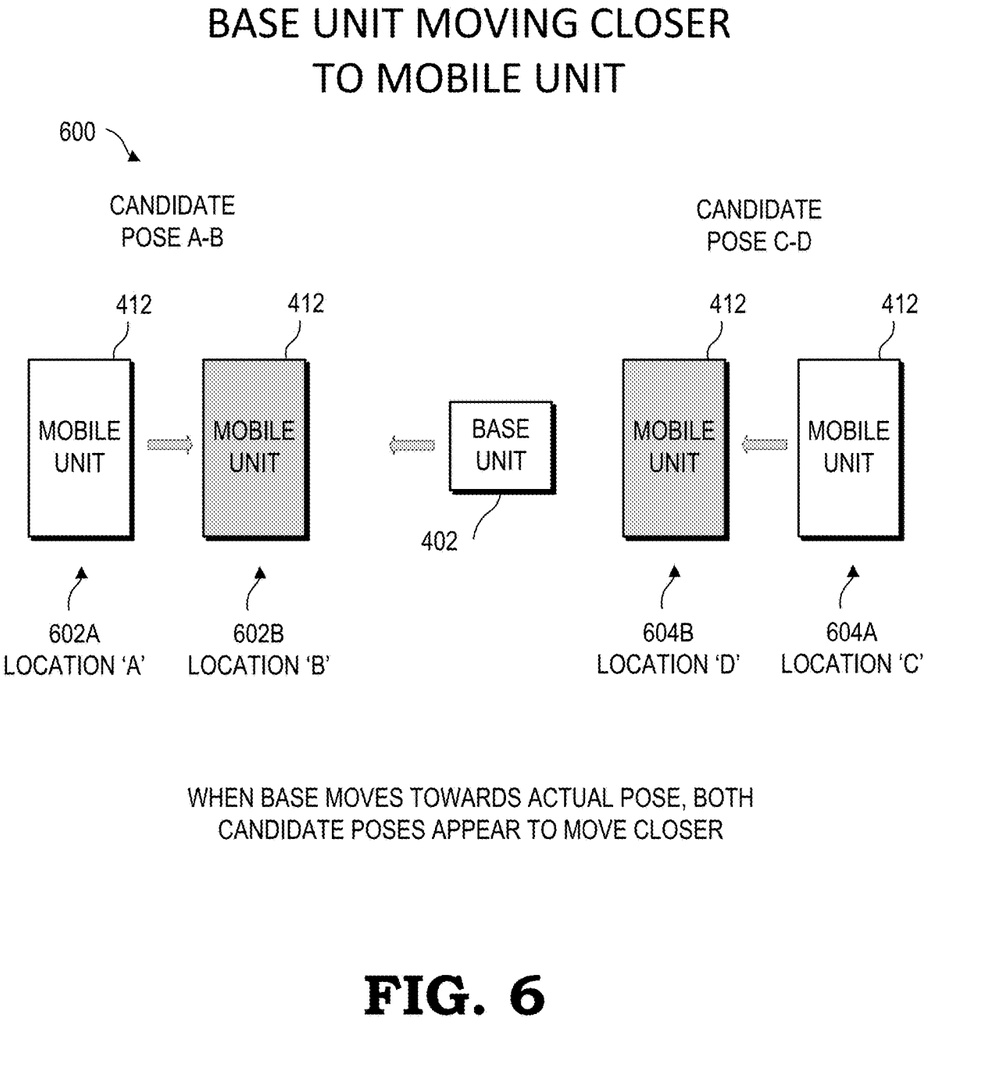
FIG. 6 is a diagram of the EM position tracking system of FIG. 4 with a moving base moving closer to a mobile unit and exhibiting hemisphere ambiguity in accordance with some embodiments.

FIG. 6 is a diagram of the EM position tracking system 400 (FIG. 4) performing hemisphere disambiguation with a moving base 402, and in particular with the base unit 402 moving closer to the mobile unit 412 and exhibiting hemisphere ambiguity in accordance with some embodiments. In the illustrated example, the base 402 identifies two candidate poses: a pose that starts at location 'A' 602A and ends its apparent movement (resulting from the EM tracking system 400) at location 'B' 602B, and a candidate pose that begins its apparent movement at location 'C' 504A and ends its apparent movement at location 'D' 504B. In the foregoing example, the apparent movement of the base unit 102 in relation to the mobile unit 112 is determined from the EM position tracking system 400 of FIG. 4 and. In at least some embodiments, the base unit 402 moves closer to one of the candidate poses, whereby the movement of the base unit 402 can be used for hemisphere disambiguation. One characteristic of hemisphere ambiguity is that when the range between the correct candidate pose and the base unit 402 decreases, the range to both candidate poses decrease. Therefore, if a candidate pose is stationary and the base unit 402 moves towards the correct candidate pose, the range to both the candidate poses decreases. In a likewise method, if the base unit 102 moves away from the correct candidate pose, the range to both candidate poses increases.

The position of the candidate poses in relation to the base unit 402 is measured using EM position tracking technology.

The base unit 402 includes the second sensor 420 of FIG. 4 to determine the direction of movement values of the base unit 402. The second sensor can be any sensor that can be used to derive direction of motion. Examples include but are not limited to an IMU, a magnetometer, inertial sensors, pose sensors, a SLAM system, or another positioning system. When the second sensor 420 calculates that the base unit 402 has moved towards a first candidate pose, the range between the base unit 102 and the candidate poses is re-calculated using the EM pose data. If the calculated range to both the candidate pose mobile units 112 has decreased, then the first candidate pose is the correct pose. If the calculated range shows that the range has increased, the other candidate pose is the correct pose.

In some embodiments, the EM position tracking system 400 with a moving base is located within a world frame, with the base unit 402 and the mobile unit 412 anywhere within the sphere of the world frame. In at least some embodiments, both the base unit 402 and the mobile unit 412 are in motion relative to the world frame. The process disclosed above will produce the final pose regardless of whether one or both the base unit 402 and the mobile unit 412 are moving in the world frame by using the net movement of the base relative to the mobile unit. In another example, assume the base unit 402 is moving towards the candidate pose mobile unit 412 while the candidate pose mobile unit 412 is moving towards the base unit 402. In some embodiments, the direction of movement of the base unit 402 is derived from acceleration, or velocity, or change in distance of the base unit 402.

Figure 7:
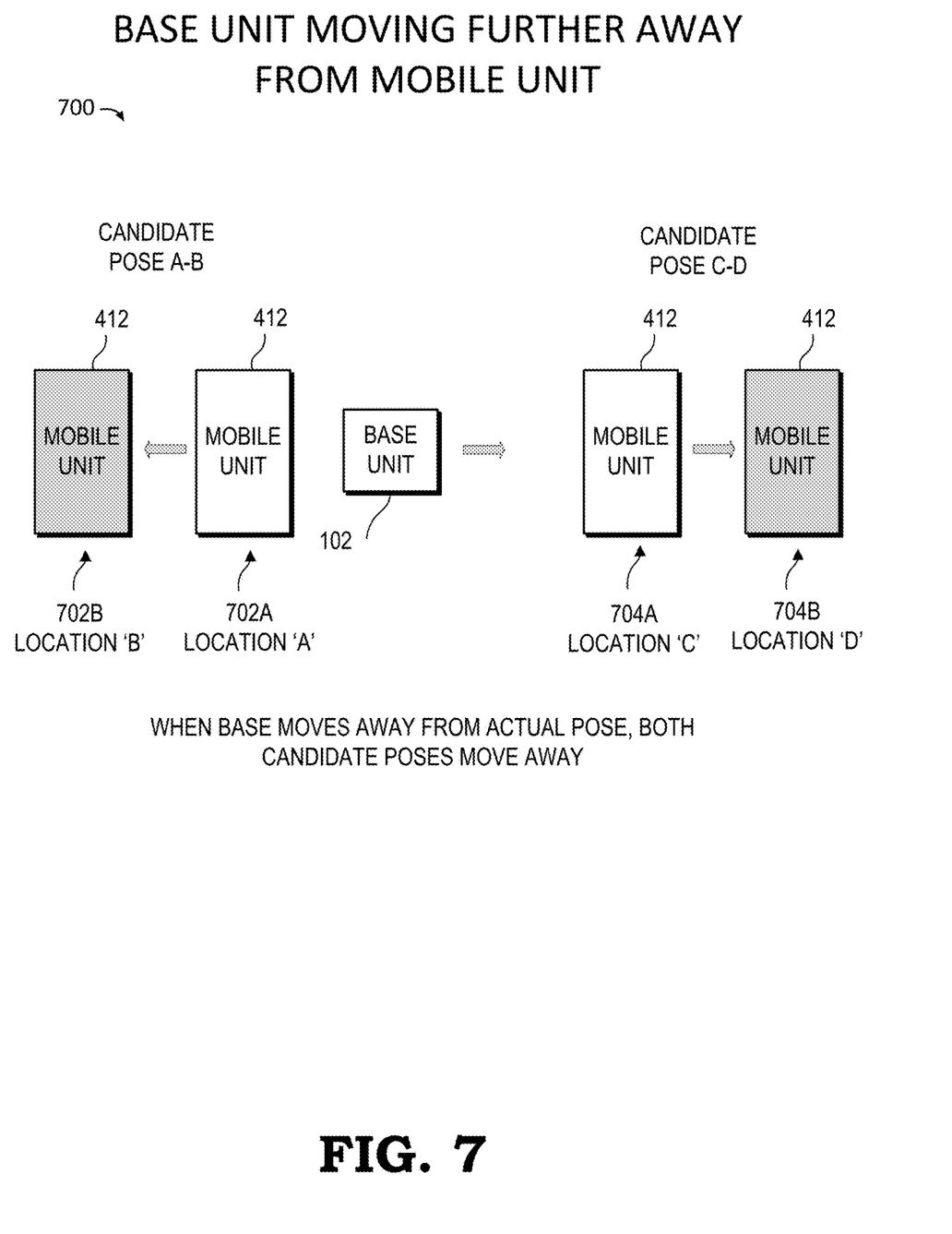
FIG. 7 is a diagram of the EM position tracking system of FIG. 4 with a moving base moving away from a mobile unit and exhibiting hemisphere ambiguity in accordance with some embodiments.

FIG. 7 is a diagram of the EM position tracking system 400 of FIG. 4 with a with the base unit 402 moving away from the mobile unit 412 and exhibiting hemisphere ambiguity in accordance with some embodiments. The EM position tracking system 400 with the moving base is similar to that disclosed in FIG. 6 except that the base unit 402 is moving away from the correct candidate pose. In the illustrated example, the base unit 402 is moving, resulting in a candidate pose that start at location 'A' 702A and ends its apparent movement at location 'B' 702B, and a candidate pose that begins its apparent movement at location 'C' 704A and ends its apparent movement at location 'D' 704B. In the example of FIG. 7, the base unit 402 is moving, resulting in an apparent movement of the candidate poses away from the base unit 402. In at least some embodiments, the movement of the base unit 402 can be used for hemisphere disambiguation as described above with respect to FIG. 6.

Figure 8:
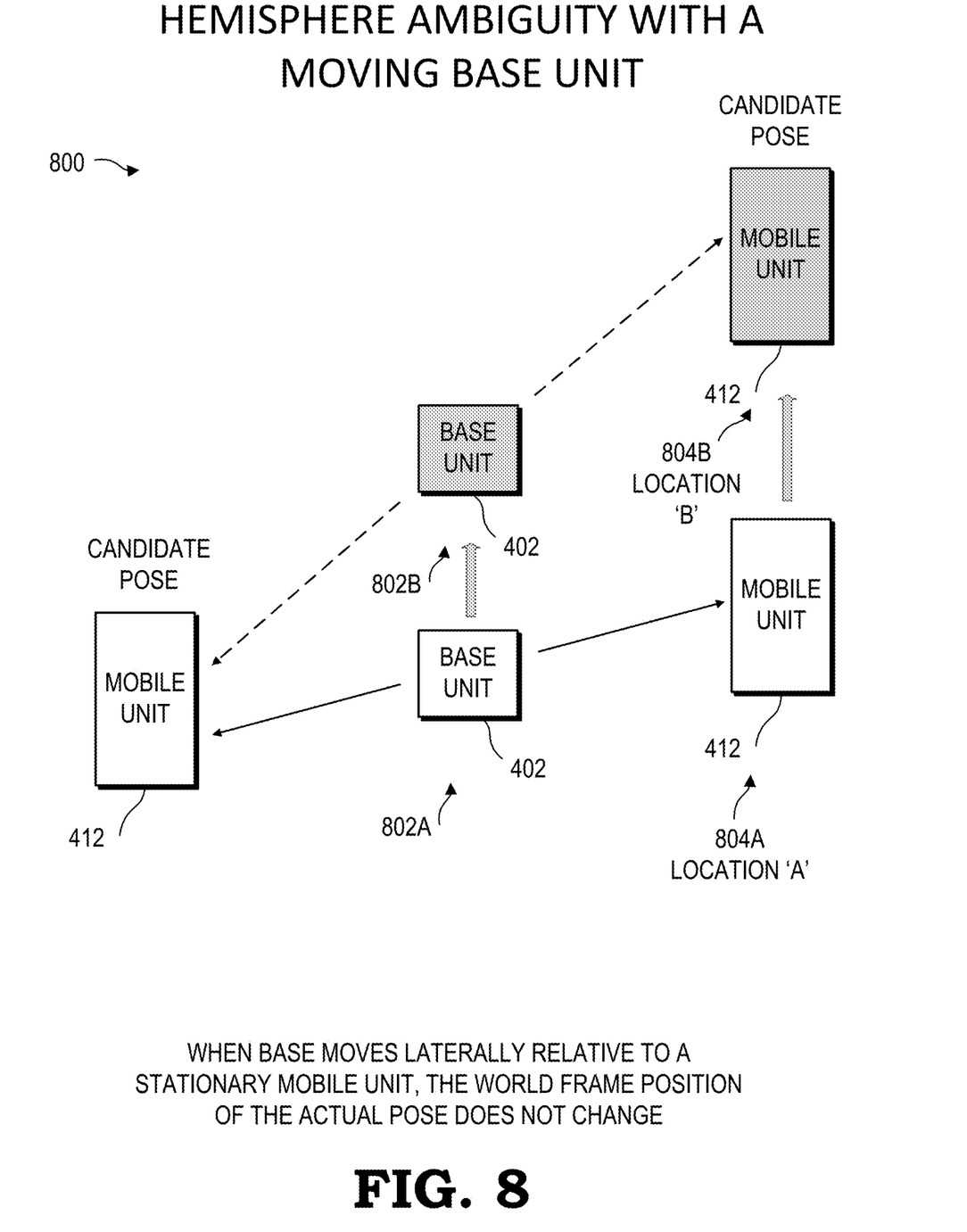
FIG. 8 is a block diagram of the EM position tracking system of FIG. 4 with the base unit moving laterally in relation to a stationary mobile unit and showing hemisphere ambiguity in accordance with some embodiments.

FIG. 8 is a block diagram of the EM position tracking system 400 with the base unit 402 moving laterally in relation to a mobile unit 412 and showing hemisphere ambiguity in accordance with some embodiments. In the illustrated example, the base unit 402 starts at location 'A' 702A and moves laterally to location 'B' 702B in relation to the mobile unit 412. In at least some embodiments, the base unit 102 uses the second sensor 420 to track the pose of the base unit 402 in relation to the world frame environment. The second sensor 420 is a non-EM sensor that indicates the position of the base unit 102 in a world frame. Thus, the second sensor, in the embodiment of FIG. 8, can be a SLAM module, a GPS module, pose sensor, or other sensor that can identify the position of the base unit 402 in the world frame. By using the second sensor, poses calculated from the EM position tracking system 400 of FIG. 1 are transformed into the world frame. When the base unit 402 moves relative to the mobile unit 412, one candidate pose associated with the mobile unit 412 will remain in the correct position in the world frame while another candidate pose associated with the mobile unit 412 will move to an erroneous position in the world frame from location 'A' 804A to location 'B' 804B. The pose that remains in the correct position in the world frame is the correct pose. In at least some embodiments, the same process described in FIG. 8 for hemisphere disambiguation can be applied when the mobile unit 412 is stationary, and in other embodiments when the mobile unit is in motion.

Figure 9:
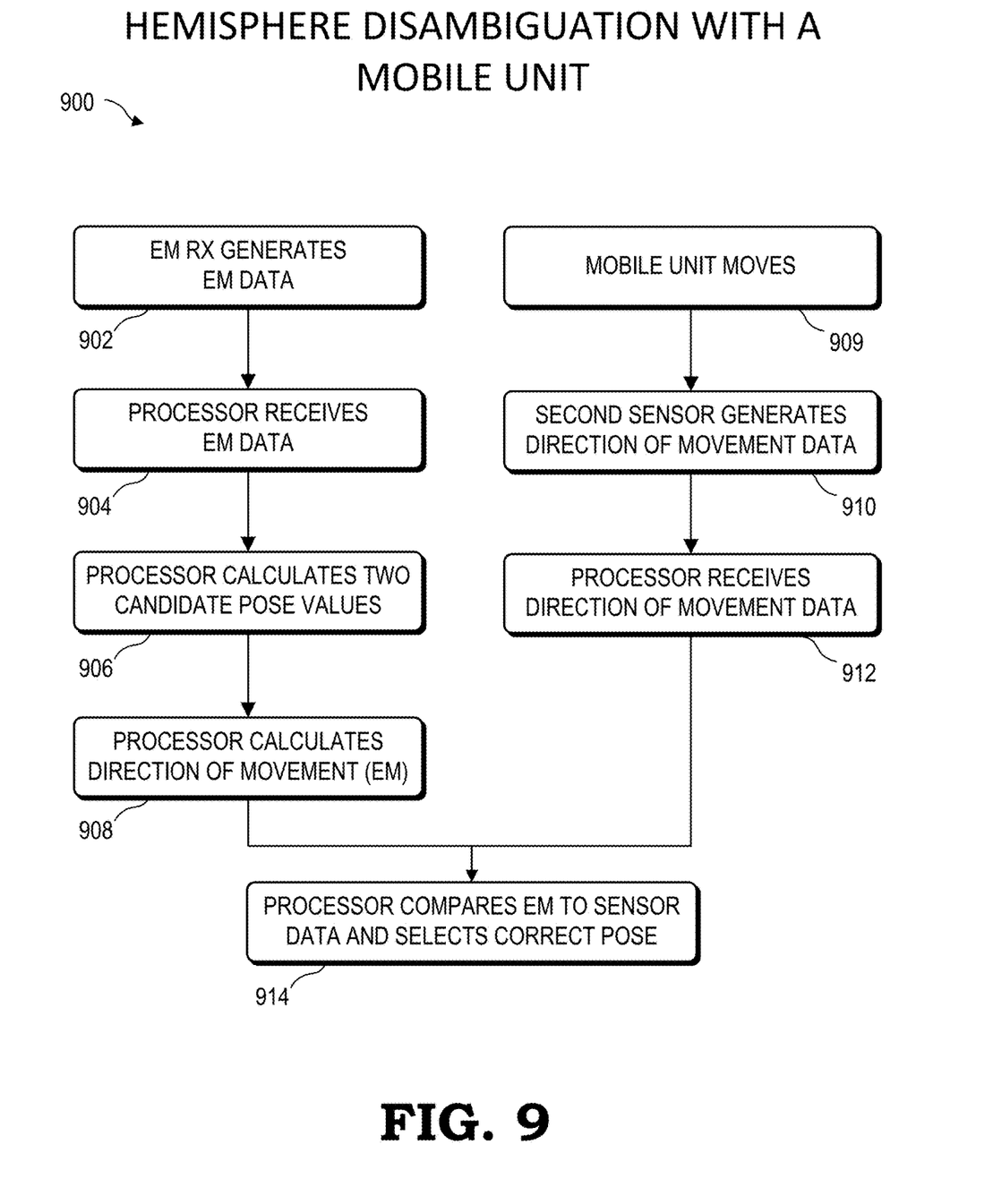
FIG. 9 is a flow diagram of a method of hemisphere disambiguation at the EM position tracking system of FIG. 1, with a controller in motion in relation to a base unit in accordance with some embodiments.

FIG. 9 is a flow diagram of a method 900 of hemisphere disambiguation by the EM position tracking system 100 of FIG. 1, with a mobile unit 112 of FIG. 1 in motion in relation to a base unit 102 in accordance with some embodiments. Either first processor 108 or the second processor 118 or a third processor (not shown) can execute the instructions for correcting for hemisphere ambiguity as described herein. For the following description, it is assumed that all calculations are done by the base unit 102 first processor 108. However, the mobile unit 112 second processor 118 can execute the instructions, or, in some embodiments, the workload can be shared between first processor 108 and the second processor 118 without limitation. Also in some embodiments, some portions of the process can be executed by a third processor. At block 902, the Tx module 105, located in the base unit 102 of the EM position tracking system 100 of FIG. 1, generates the EM field 110, whose signals are received by the Rx module 115 located in the mobile unit 112. The Rx module 115 generates EM data which is sent to the first processor 108. At block 904, the first processor 108 receives the EM data from the mobile unit 112. At block 906, the first processor 108 uses the EM data and calculates a set of candidate pose solution values corresponding to the pose of the mobile unit 112 in relation to the base unit 102. As the set of candidate pose solution values are calculated using data from EM coils, at least two separate and valid candidate pose solutions result from the calculations, with each solution on opposite points of a sphere, where only one candidate pose is correct. At block 908, the first processor 108 calculates an estimated direction of movement value for the candidate poses based on previously computed candidate poses. Meanwhile, at block 909 the mobile unit 112 moves to a new pose in relation to the base unit 102. At block 910, the mobile unit 112 second sensor 120 provides data that is used to generate direction of movement data and sends the data to the first processor 108. At block 912, the first processor 108 receives the direction of movement data from the mobile unit 112. At block 914, the first processor 108 compares the estimated direction of movement of the candidate poses to the direction of movement data, and selects the correct candidate pose. The hemisphere disambiguation process 800 thus selects, from the set of two candidate poses, using the direction of movement data to determine the final pose value. The first processor 108 then outputs the final pose data to the EM position tracking system 100 of FIG. 1.

Figure 10:
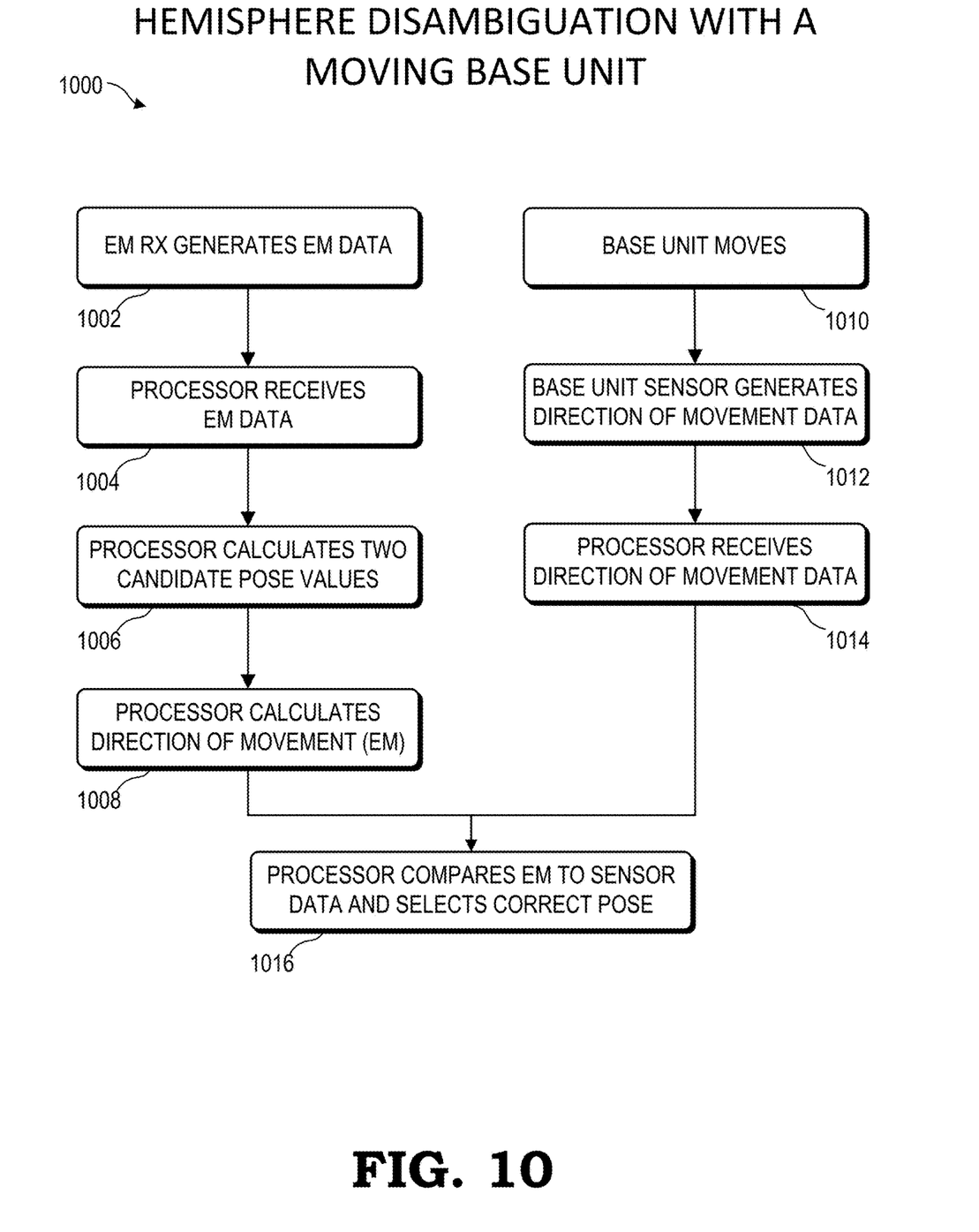
FIG. 10 is a flow diagram of a method of hemisphere disambiguation at the EM position tracking system of FIG. 4, with a base unit in motion in relation to a mobile unit in accordance with some embodiments.

FIG. 10 is a flow diagram of a method of hemisphere disambiguation 1000 by the EM position tracking system 400 of FIG. 4 in accordance with some embodiments. FIG. 10 describes a hemisphere disambiguation process wherein the base unit 402 is moving relative to the mobile unit 412. Either first processor 408 or the second processor 418 of FIG. 4 or a third processor can execute the instructions for correcting for hemisphere ambiguity as disclosed in the following disclosure. For the following description, it is assumed that all calculations are done by the base unit 402 first processor 408. However, in other embodiments the calculations can be executed by the second processor 418 of the mobile unit 412, or, in some embodiments, the workload can be shared between the first processor 408 and the second processor 418 or a third processor without limitation.

At block 1002, the mobile unit 412 generates an EM field 410, and the Rx module 405 of the base unit 402 generates EM sensor data based on the relative magnitudes of the EM field 410. At block 1004, the first processor 408 receives the EM sensor data from the Rx module 405. At block 1006, the first processor 408 uses the EM sensor data to calculate a set of candidate pose solution values corresponding to the pose of the mobile unit 412 in relation to the base unit 402. At least two separate and valid candidate pose solutions result from the calculations, with each solution on opposite points of a sphere, where only one pose is correct. At block 1008, the first processor 408 calculates an estimated direction of movement of the base unit 402 using previous candidate pose calculations. Meanwhile, at block 1010, the base unit 402 moves to a new pose in relation to the mobile unit 412. At block 1012, the second sensor data 420 generates direction of movement data and sends the data to the first processor 408. At block 1014, the first processor 408 receives the direction of movement data from the second sensor 420. At block 1016, the processor 408 compares the EM pose data to the direction of movement data to select the correct hemisphere. The processor 408 then outputs the final pose data to the EM position tracking system 400.

In some embodiments, certain aspects of the techniques described above may implemented by one or more processors executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    receiving electromagnetic (EM) field magnitude values indicative of a first pose of a mobile unit in relation to a base unit;
    calculating, by one or more processors, a set of candidate pose solutions based on the EM field magnitude values;
    detecting movement at least one of the base unit and the mobile unit;
    receiving sensor data from a second sensor associated with one of the mobile unit and the base unit, wherein the sensor data is indicative of a direction of the movement of the at least one of the mobile unit and the base unit; and
    selecting a final pose from the set of candidate pose solutions based on the sensor data from the second sensor, wherein selecting the final pose comprises:
        calculating corresponding expected positions for the set of candidate pose solutions based on movement of the at least one of the base unit and the mobile unit; and
        selecting the candidate pose solution whose position most closely matches the corresponding expected position.

2. The method of claim 1,
    wherein calculating the corresponding expected positions comprises:
        calculating, by the one or more processors, a first movement vector for each of the candidate pose solutions; and
        calculating, by the one or more processors, a second movement vector of the mobile unit based on the sensor data from the second sensor; and
    wherein selecting the candidate pose solution comprises:
        comparing the first movement vectors to the second movement vector; and
        selecting one of the candidate pose solutions associated with the first movement vector that is closest in value to the second movement vector.

3. The method of claim 2, wherein the second movement vector further comprises one of a distance vector, a velocity vector, and an acceleration vector.

4. The method of claim 1, wherein the base unit comprises one of an EM transmitter and an EM receiver.

5. The method of claim 1, wherein the mobile unit comprises one of an EM receiver and an EM transmitter.

6. The method of claim 1, wherein the base unit comprises a head-mounted display device.

7. The method of claim 1, wherein the mobile unit comprises a virtual reality handheld controller device.

8. The method of claim 1,
wherein detecting the movement of the at least one of the base unit and the mobile unit comprises detecting that the base unit has moved closer to one of the candidate pose solutions;
wherein calculating the corresponding expected positions for the set of candidate pose solutions comprises:
calculating a movement vector of the base unit using sensor data from the second sensor, wherein the movement vector includes one of a distance vector, a velocity vector, or an acceleration vector; and
calculating, by the one or more processors using EM field magnitude data, respective distances between the base unit and the set of candidate pose solutions; and
wherein selecting the candidate pose solution comprises selecting the candidate pose value whose respective distance has correspondingly decreased.

9. The method of claim 1, wherein:
wherein detecting the movement of the at least one of the base unit and the mobile unit comprises detecting that the base unit has moved away from one of the candidate pose solutions;
wherein calculating the corresponding expected positions for the set of candidate pose solutions comprises:
calculating a movement vector of the base unit using sensor data from the second sensor, wherein the movement vector includes one of a distance vector, a velocity vector, or an acceleration vector;
calculating, using EM field magnitude data, respective distances between the base unit and the set of candidate pose solutions; and
wherein selecting the candidate pose solution comprises selecting the candidate pose solution whose respective distance has correspondingly increased.

10. The method of claim 1, wherein the sensor data is indicative of a position of the one of the base unit and the mobile unit in relation to a world frame.

11. The method of claim 10,
wherein calculating the corresponding expected positions for the set of candidate pose solutions comprises:
calculating a movement vector of the one of the base unit and the mobile unit using sensor data from the second sensor, wherein the movement vector includes one of a distance vector, a velocity vector, and an acceleration vector;
converting the set of candidate pose solutions to the world frame using sensor data from the second sensor; and
calculating the corresponding expected positions in the world frame for the set of candidate pose solutions based on the movement vector; and
wherein selecting the candidate pose comprises selecting the candidate pose solution whose position in the world frame most closely matches the corresponding expected position in the world frame.

12. The method of claim 1, wherein the set of candidate pose solutions are opposite points of a sphere.

13. A system comprising:
a base unit within an electromagnetic (EM) field;
a mobile unit located within the EM field;
an EM transmitter that generates the EM field and is associated with one of the base unit and the mobile unit;
an EM receiver that senses EM field magnitude values and is associated with the other of the mobile unit and the base unit;
a second sensor, associated with one of the mobile unit and the base unit, wherein the second sensor generates sensor data indicative of a direction of movement value of the one of the mobile unit and the base unit; and
at least one processor that calculates a set of candidate pose solutions of the mobile unit relative to the base unit based on the EM field magnitude values, calculates corresponding expected positions for the set of candidate pose solutions in response to detecting movement of the at least one of the mobile unit and the base unit, and selects a final pose from the set of candidate pose solutions based on the sensor data from the second sensor and based on differences between the corresponding expected positions and positions of the set of candidate pose solutions.

14. The system of claim 13, further comprising:
a set of first movement vectors, calculated by the at least one processor, based on the EM field magnitude values;
a second movement vector, calculated by the at least one processor, based on the sensor data from the second sensor; and
the final pose, selected by the at least one processor, based on the first movement vectors and the second movement vector.

15. The system of claim 13, wherein a head-mounted display device comprises the EM transmitter.

16. The system of claim 13, wherein a virtual reality handheld controller device comprises the EM receiver.

17. The system of claim 13, wherein the processor selecting the final pose comprises:
calculating, by the at least one processor, a set of first movement vectors based on the EM field magnitude values of the base unit indicating that the base unit has moved towards one of the candidate pose solutions;
calculating, by the at least one processor, a second movement vector based on the sensor data from the second sensor, and based on detecting that the base unit has moved towards one of the candidate pose solutions; and
selecting, by the at least one processor, the final pose based on the first movement vectors and the second movement vector, based on the candidate pose solution that has a decreased distance.

18. The system of claim 13, wherein the processor selecting the final pose comprises:
calculating, by the at least one processor, a set of first movement vectors based on the EM field magnitude values of the base unit indicating that the base unit has moved away from one of the candidate pose solutions;
calculating, by the at least one processor, a second movement vector based on the sensor data from the second sensor, and based on detecting that the base unit has moved away from one of the candidate pose solutions; and
selecting, by the at least one processor, the final pose based on the first movement vectors and the second movement vector, based on the candidate pose solution that has an increased distance.

19. The system of claim 13, wherein the second sensor generates data used to calculate a position of the base unit in relation to a world frame.

20. The system of claim 19,
wherein the at least one processor calculates corresponding expected positions for the set of candidate pose solutions by:
calculating a movement vector of the one of the base unit and the mobile unit using sensor data from the second sensor, wherein the movement vector includes one of a distance vector, a velocity vector, and an acceleration vector;
converting the set of candidate pose solutions to the world frame using sensor data from the second sensor; and
calculating corresponding expected positions in the world frame for the set of candidate pose solutions based on the movement vector; and
wherein the at least one processor calculates corresponding expected positions for the set of candidate pose solutions by selecting the candidate pose solution whose position in the world frame most closely matches the corresponding expected position in the world frame.

\* \* \* \* \*